No. 750,467. PATENTED JAN. 26, 1904.
S. KURZMAN.
CART COVER.
APPLICATION FILED JUNE 24, 1903.
NO MODEL. 2 SHEETS—SHEET 1.
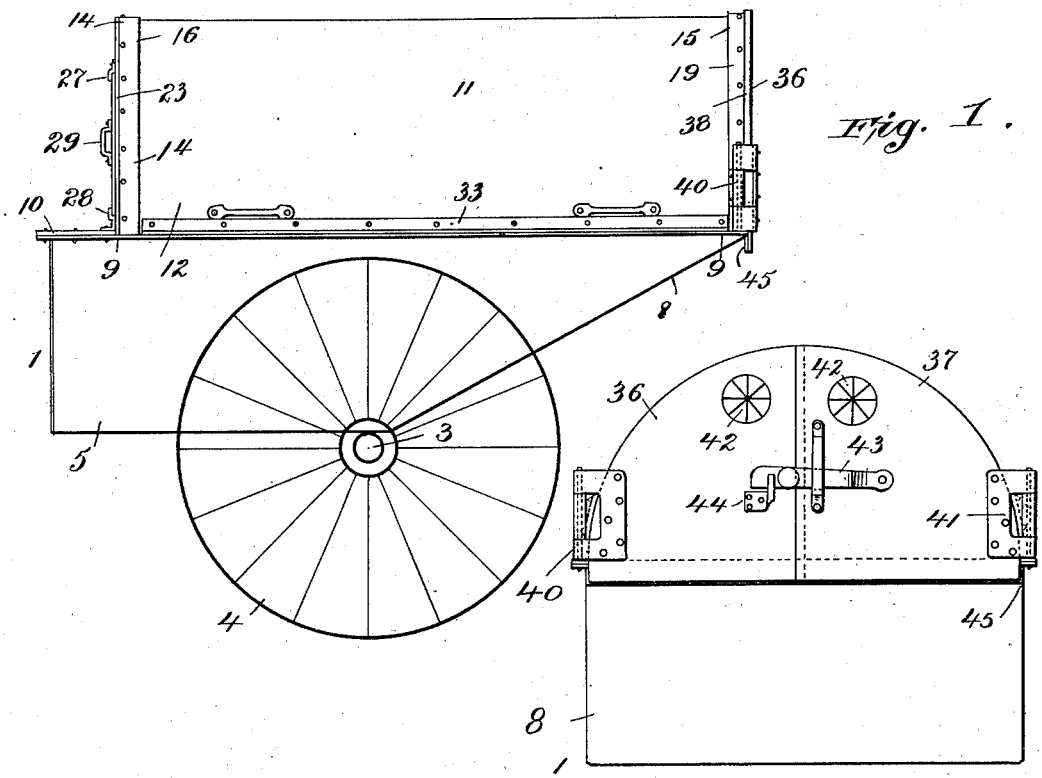
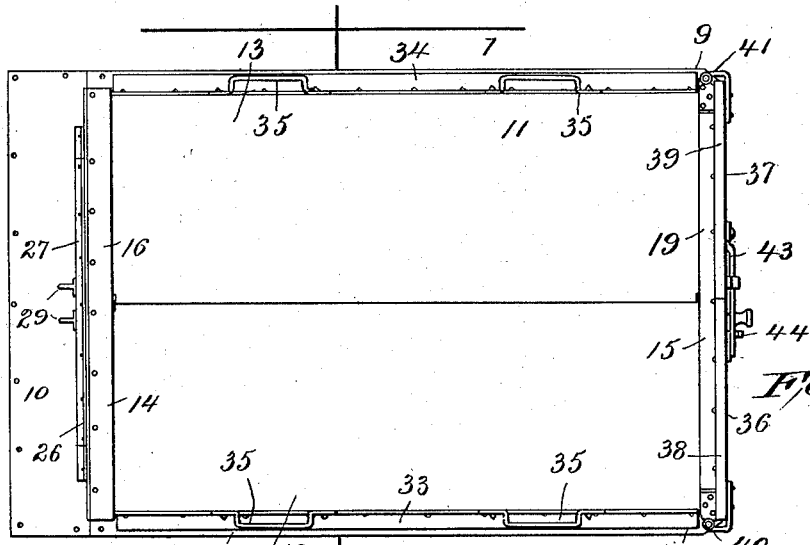

No. 750,467. PATENTED JAN. 26, 1904.
S. KURZMAN.
CART COVER.
APPLICATION FILED JUNE 24, 1903.
NO MODEL. 2 SHEETS—SHEET 2.
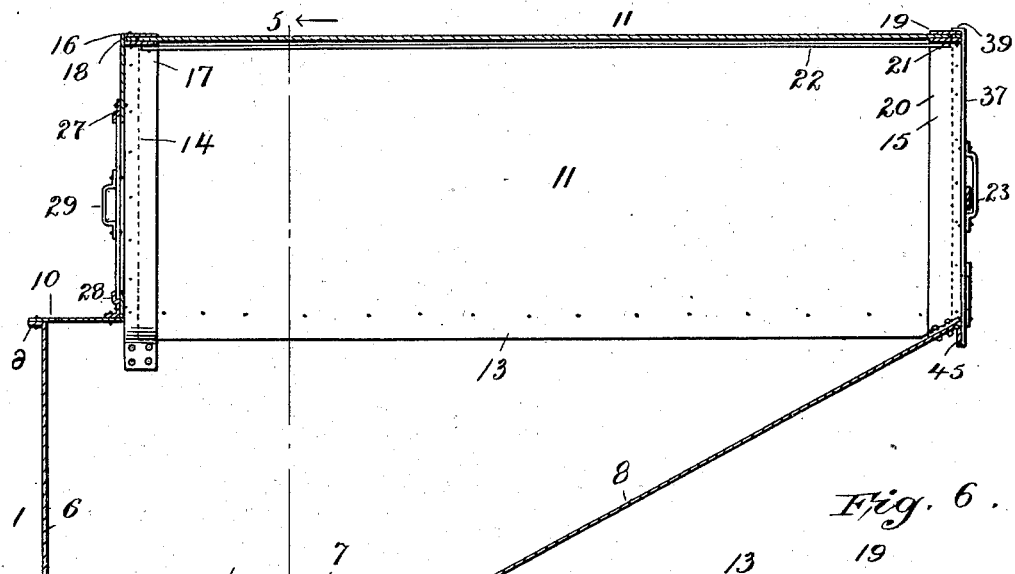
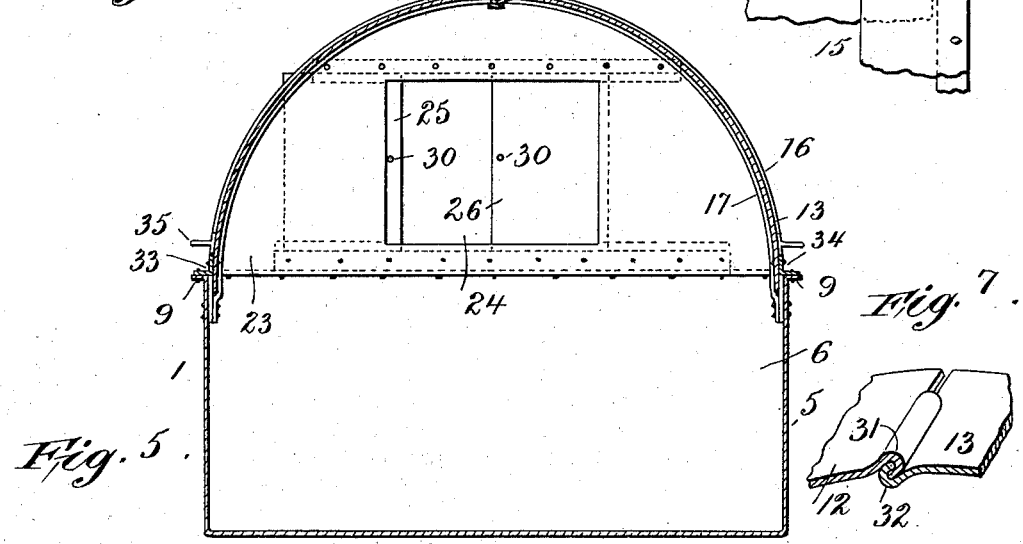
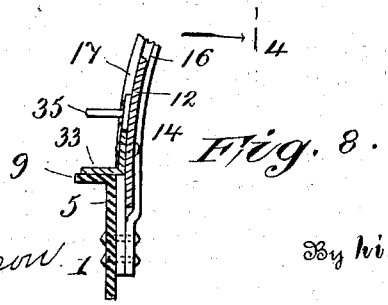
Witnesses
Inventor
Samuel Kurzman.
By his Attorney Benedict S Wase No. 750,467. Patented January 26, 1904.

UNITED STATES PATENT OFFICE.

SAMUEL KURZMAN, OF NEW YORK, N. Y.

CART-COVER.

SPECIFICATION forming part of Letters Patent No. 750,467, dated January 26, 1904.

Application filed June 24, 1903. Serial No. 162,849. (No model.)

*To all whom it may concern:*

Be it known that I, SAMUEL KURZMAN, a citizen of the United States, and a resident of the city, county, and State of New York, have invented a new and useful Improvement in Covers for Carts and the Like, of which the following is a specification.

The object of my invention is to provide a cover of this class which may be applied to any form of cart to protect or cover the contents thereof and which will be simple, durable, and efficient at all times.

More particularly my invention relates to covers for ash-carts, so that these vehicles will be provided with means which will not interfere either with the loading or unloading of the cart and yet will completely cover the ashes or other material and prevent them from being scattered when dumped into the cart.

For a more particular description of one embodiment of my invention reference is to be had to the accompanying drawings, forming a part hereof, in which—

Figure 1 is a side elevation of a cart-body provided with my improved cover, parts of the cart being shown diagrammatically. Fig. 2 is a rear end elevation of the same. Fig. 3 is a plan view of the same. Fig. 4 is a longitudinal section taken on the line 4 4 of Fig. 5 looking in the direction of the arrows. Fig. 5 is a transverse section of the line 5 5 of Fig. 4 looking in the direction of the arrows. Figs. 6, 7, and 8 are detailed views.

Throughout the various views similar reference characters designate similar parts.

The body or bed 1 of the cart may be of any suitable form, and the cart or wagon may be of any convenient type, although my invention is preferably applied to dump-carts, as hereinafter set forth. The bed 1 rests on an axle 3, which passes through brackets 2. Wheels 4 support the cart and are placed on the axle 3, all of which is customary and conventional and forms no part of my invention. This bed 1 is also provided with sides 5, front 6, bottom 7, and an inclined rear 8, which extends from the rear upper edges of the sides 5 to the bottom 7. The proportions of these parts may be varied, although it is preferable to have them substantially as shown, and the entire body is preferably made of sheet metal, because of its strength and durability. The upper edges of the sides 5 and front 6 are turned outwardly to form a horizontal flange 9, on which is secured the seat 10 and the cover 11. This cover 11 extends from the rear of the bed 1 to the seat 10, which is at the front and comprises two slides 12 and 13, which are bent so as to move freely between the guides 14 and 15, which are curved on arcs of circles and fixed to the walls 5 and rear portion at each end of the cover. The guides 14 and 15 comprise bent bands 16 and 17, with their separating-strip 18, and the bands 19 and 20, with their separating-strip 21, the former being at the front and the latter at the rear of the bed 1. The bands are riveted to their respective strips and to the walls 5 and rear portion 8. To further strengthen and brace the structure, the guides 14 and 15 are connected by the tie-rod 22 and fixed thereto and the guide 14 is riveted to the plate 23. This plate is provided with a rectangular opening 24, which is large enough to enable a workman to distribute the ashes or other material evenly over the bed 1, and this opening also serves another purpose, as will appear below. Doors 25 and 26, which slide between the plate 23 and angle-irons 27 and 28, are adapted to close the opening 24 when the handles 29 are brought together. Stops 30 prevent the doors from being opened too wide or from becoming detached. The lower angle-iron 28 is riveted to the seat 10.

The slides 12 and 13 are curved at their upper edges 31 and 32 to interlock when the cover is closed, except at the extreme ends, where this curvature would interfere with the guides 14 and 15, and at their lower edges the slides 12 and 13 are provided with angle-irons 33 and 34, which are riveted to their respective slides, and handles 35, similar to handles 29, are secured to each slide adjacent to the angle-irons 33 and 34, two on each slide being preferable, although any number may be employed. The angle-irons 33 and 34 serve to stiffen and strengthen the slides 12 and 13 and also serve to form a tight joint with the flange 9, on which they rest. The handles 35 enable the slides to be raised until the cover 11 is substantially half-open, and this cover may be opened on either side, as may be convenient.

The rear of the cover is closed by two doors 36 and 37, which are provided with flanges 38 and 39, that rest on the guide 15, and hinges 40 and 41, which are fixed to said guide 15 by rivets or equivalent means just above the flange 9 and to the doors 36 and 37 by means of rearwardly-extending arms, which are bent at right angles and secured to the outer faces of the doors. These doors are also provided with dampers 42 in their upper portions and a latch 43 on the door 37, which engages a catch 44 on the door 36. These doors are extended downwardly far enough to engage and rest against a downwardly-turned flange 45 on the rear portion 8, so that when the doors are closed they form a tight joint with the guide 15 and flange 45, and when the latch 43 is released they may be swung open. The flanges 38 and 39 keep these doors from sagging, but do not interfere with their opening or closing because of the position of the hinges 40 and 41.

From the foregoing the operation of my improvement will be readily understood. Assuming the bed 1 to be empty and the cover 11 in the position shown, the doors 25 and 26 are opened, as well as the dampers 42, any or all of them, as may be necessary. One of the slides 12 or 13 is then raised and the ashes are poured into the bed 1 in the usual way. Heretofore in the wagons of this class provided with a cover there has been no vent, so that the ashes have been disturbed by the displaced air and blown into the faces of the workmen, as well as out onto the sidewalk. Because of the vents through the opening 24 and dampers 42 the displaced air rushes out therethrough and not through the incoming ashes. This prevents the ashes from being blown either into the faces of the workmen or into the street. Should a high wind prevail, the dampers 42 and opening 24 may be partially closed, so that this wind will not disturb the ashes and distribute them over the street, as is now common with open carts. In any case my improved cover amply protects the ashes and prevents their distribution without interfering with the loading of the cart. The openings are large enough to enable the workmen to distribute the ashes over the bed. When the cart is loaded and the slides, doors, and dampers closed, the joints are sufficiently tight to prevent the contents from escaping and being blown about, and when the cart is dumped the latch 43 is released, the bed 1 inclined in the usual way, and the contents open the doors 36 and 37 and run out. The bed is then restored, the doors closed, and the cart is again ready for a load.

While I have shown and described my improved cover on an ash-cart because it is particularly adapted for that purpose, it is evident that it may be used for many other purposes and that details of construction, the arrangements of elements, the proportions of parts may be changed without departing from the spirit of my invention as sacrificing any of the advantages thereof and that all such changes result in equivalent structures.

Having thus described my invention, what I claim is—

1. A cover for ash-carts and the like comprising ends, guides, slides operating between said guides and ventilating-openings in said ends.

2. A cover for ash-carts and the like comprising ends, a door in one of said ends, guides fixed to said ends, and slides moving in said guides.

3. A cover for ash-carts and the like comprising ends, guides, doors at one end hinged to said guides and slides adapted to move between said guides.

4. A cover for ash-carts and the like comprising ends, guides fixed to said ends, slides adapted to move between said guides and angle-irons at the lower ends of said slides.

5. A cover for ash-carts and the like comprising ends, guides fixed to said ends, slides adapted to move between said guides and means adjacent to the lower edges of said slides to make them form a tight joint with a cart-bed.

6. A cover for ash-carts and the like comprising ends, guides fixed to said ends and interengaging slides adapted to move between said guides.

7. A cover for ash-carts and the like comprising ends, guides fixed to said ends, a tie-rod connecting said guides, and slides adapted to move between said guides.

8. A cover for ash-carts and the like comprising ends, guides fixed to said ends, one of said ends being composed of doors with flanges adapted to rest on one of said guides, and slides adapted to move between said guides.

9. A cover for ash-carts and the like comprising ends with ventilating means and opening means between said ends.

10. A cover for ash-carts and the like comprising ends, ventilating means in said ends, opening means between said ends, and means for opening the cover at one end whereby the contents of the cart may be removed.

11. A cover for ash-carts and the like comprising ends, opening means between said ends and hinged and flanged doors at one of said ends.

12. A cover for ash-carts and the like comprising ends, opening means between said ends, hinged doors at one of said ends, a latch on one of said doors and a catch on the other whereby the said doors are held in a closed condition.

Signed in the city of New York, county and State of New York, this 23d day of June, 1903.

SAMUEL KURZMAN.

Witnesses:
 HELEN W. DONNELLY,
 LEON E. JOHNSON.